INVENTOR.
CHAO KONG CHOW
BY James J. Wood
ATTORNEY

INVENTOR.
CHAO KONG CHOW
BY James J. Wood
ATTORNEY

INVENTOR.
CHAO KONG CHOW

BY James J. Wood
ATTORNEY

INVENTOR.
CHAO KONG CHOW
BY James J. Wood
ATTORNEY

INVENTOR.
CHAO KONG CHOW
BY James J. Wood
ATTORNEY

INVENTOR.
CHAO KONG CHOW
BY James J. Wood
ATTORNEY

United States Patent Office 3,341,814

Patented Sept. 12, 1967

3,341,814

CHARACTER RECOGNITION

Chao Kong Chow, Wayne, Pa., assignor to Burroughs Corporation, Detroit, Mich., a corporation of Michigan Filed July 11, 1962, Ser. No. 209,007

11 Claims. (Cl. 340—146.3)

This invention relates to a method for graphic character recognition, and more specifically, to a method for identifying alpha-numeric characters based on statistical decision theory.

In the field of automatic data processing there is the problem of providing the computer with input signals read directly from documents, or devices such as for example, checks, invoices, typewriters and the like. It is highly desirable that this information, human language as it is frequently called, should be put into machine language so that the computer will be enabled to operate directly upon the input. Formerly this was accomplished in an intermediate step in which a human operator would translate the information into machine language in some manner such as by punched tape for example. A more recent innovation in the computer art has been the attempt to read the documents directly without the intervention of any other agencies or media.

One approach in the art has been to print the characters in magnetic ink, and then by electromagnetic induction develop the information in the form of a characteristic waveshape which is then recognized. This technique has required the utilization of a special font. Another approach has been to use an optical scanning technique which would recognize or derive black and white information from the character to be identified. In the early systems at least this required also a special font, or at least the alpha-numeric characters had to be written with definite rules in mind. As the art progressed it appeared that the ultimate aim should be to recognize any character even though it is written in human handwriting, with all the vagueness and idiosyncrasies of human nature inherent therein. The next approach then was the concept of selecting special features that were common to various characters, and then grouping these features so as to make unique identifying combinations, the presence of all of an identifying set of features, or a majority of them being then sufficient to identify the character.

The present invention is addressed to still another aspect of this overall problem of character recognition, and it is based upon statistical decision theory, the optimum consisting of minimizing the error rate for a weight function which is preassigned to measure the consequences of system decisions. The present inventor has authored a paper considering this theory. It was entitled, "An Optimum Character Recognition System Using Decision Functions," and was published in the IRE Transactions on Electronic Computers, volume EC–6, pp. 247–254; December 1957. A later paper, authored by the present inventor, disclosed the present invention to those skilled in the art of character recognition. It was entitled "A Recognition Method Using Neighbor Dependence" and was published in the IRE Transactions on Electronic Computers, volume EC–11, pp. 683 to 690; October 1962.

The information in any character is virtually limitless. The task of obtaining all this information, and processing it of necessity would require an exorbitantly large amount of hardware. The problem is further complicated by the fact that seldom will a system have ideal characters to deal with, the characters usually being distorted in some way, either by bad printing or human variances in handwriting, etc. In addition, the problem is further complicated by the fact that there is noise inherent in the transducing devices themselves, so that an effective system must find a way to eliminate and disregard the spurious information if it is to be successful.

The technique must be able to identify handwriting specimens which are greatly different even for the same character. No two human beings for example write an 8 or a 9 exactly the same, and the optimum technique must enable the recognition of the 8 or 9 with all distortions, up to and including the point where a human being would continue to recognize the character. Stated differently, if a distorted 8 or 9 is written and a human being in reading this would recognize that it is a distorted 8 or 9 as the case may be, then it is a desirable objective that the system also recognize these distorted characters.

Although we have spoken of the instant invention as finding utility for the recognition of alpha-numeric characters, it nevertheless is not so limited, and would have utility in recognizing any pattern. Further, the system would have no difficulty whatsoever in recognizing other alphabets other than the Roman alphabet. For example, the method is general enough to find utilization in identifying the Cyrillic alphabet.

The preferred method of the instant invention provides a technique for identifying alpha-numeric characters or other patterns. Based on the statistical history derived from a large number of specimen characters or patterns the conditional probabilities of all input characters or patterns to be read are determined, the conditional probability of any locus within an arrangement of a character or pattern, being a function of the intelligence contained in the neighborhood loci. A weighting network is prepared, one for each respective character or pattern based on these conditional probabilities. Signal information is then derived from a matrix arrangement of the character or pattern to be identified, the resulting signals being then applied to all said weighting networks, the output for each network being a signal respectively indicative of the mathematical probability that the character to be identified will be coincident with the character or pattern representing that repsective weighting network. Finally, the decision is made and the maximum probability signal is determined to thereby identify the character or pattern under investigation.

Accordingly, it is an object of the present invention to provide an improved method for identifying alpha-numeric characters or other patterns by the statistical decision technique based on nearest neighbor dependence.

Another object of the present invention is to provide a method for identifying alpha-numeric characters or other patterns using the minimum amount of information consonant with the maximum probability that the decision will be correct.

The novel features which are believed to be characteristic of this invention are set forth with particularity in the appended claims. The invention itself however, both as to its organization and method of operation together with further objects and advantages thereof may best be understood by reference to the following description taken in connection with the accompanying drawings in which:

Figures 6, 6A:
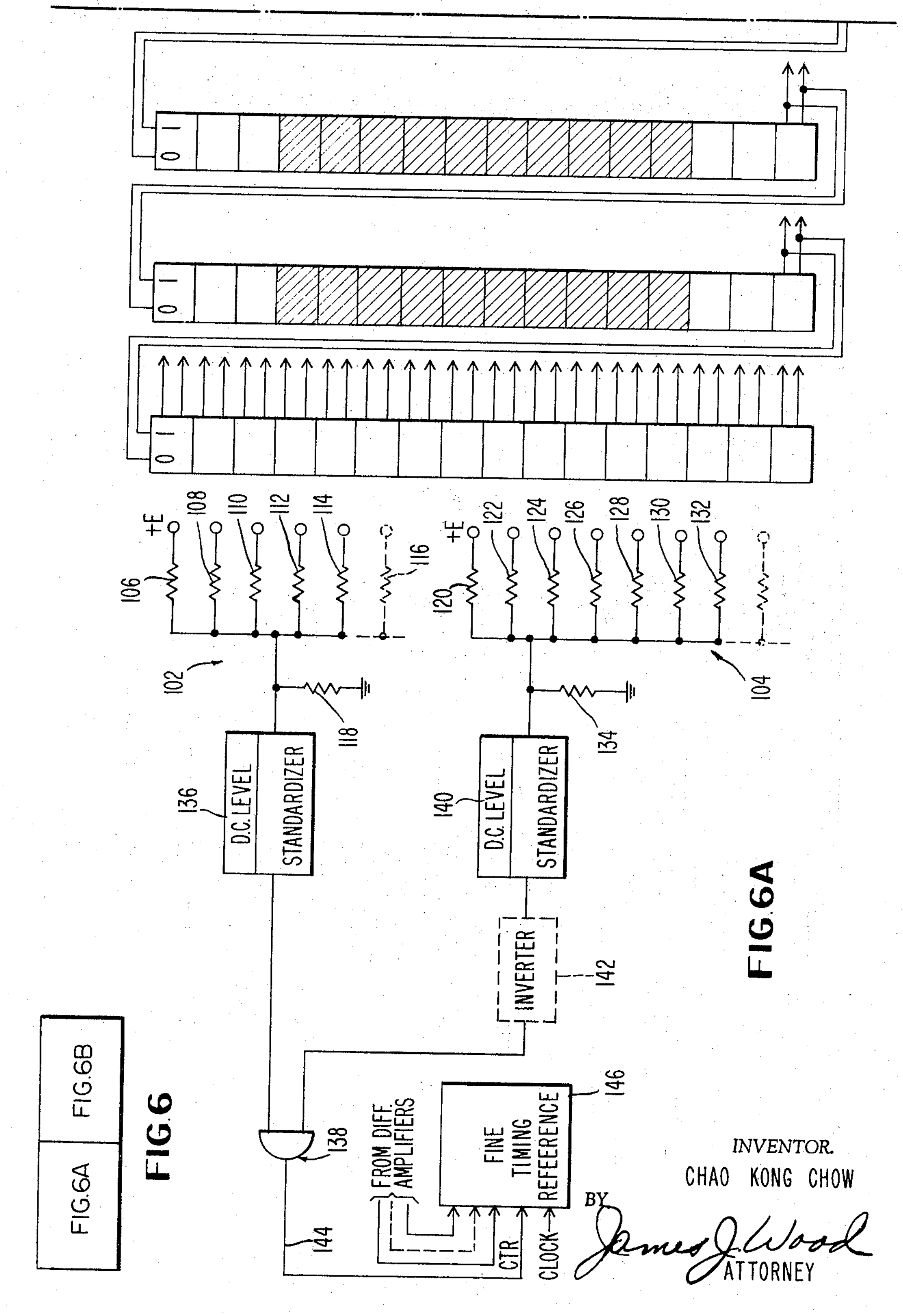
Figure 6B:
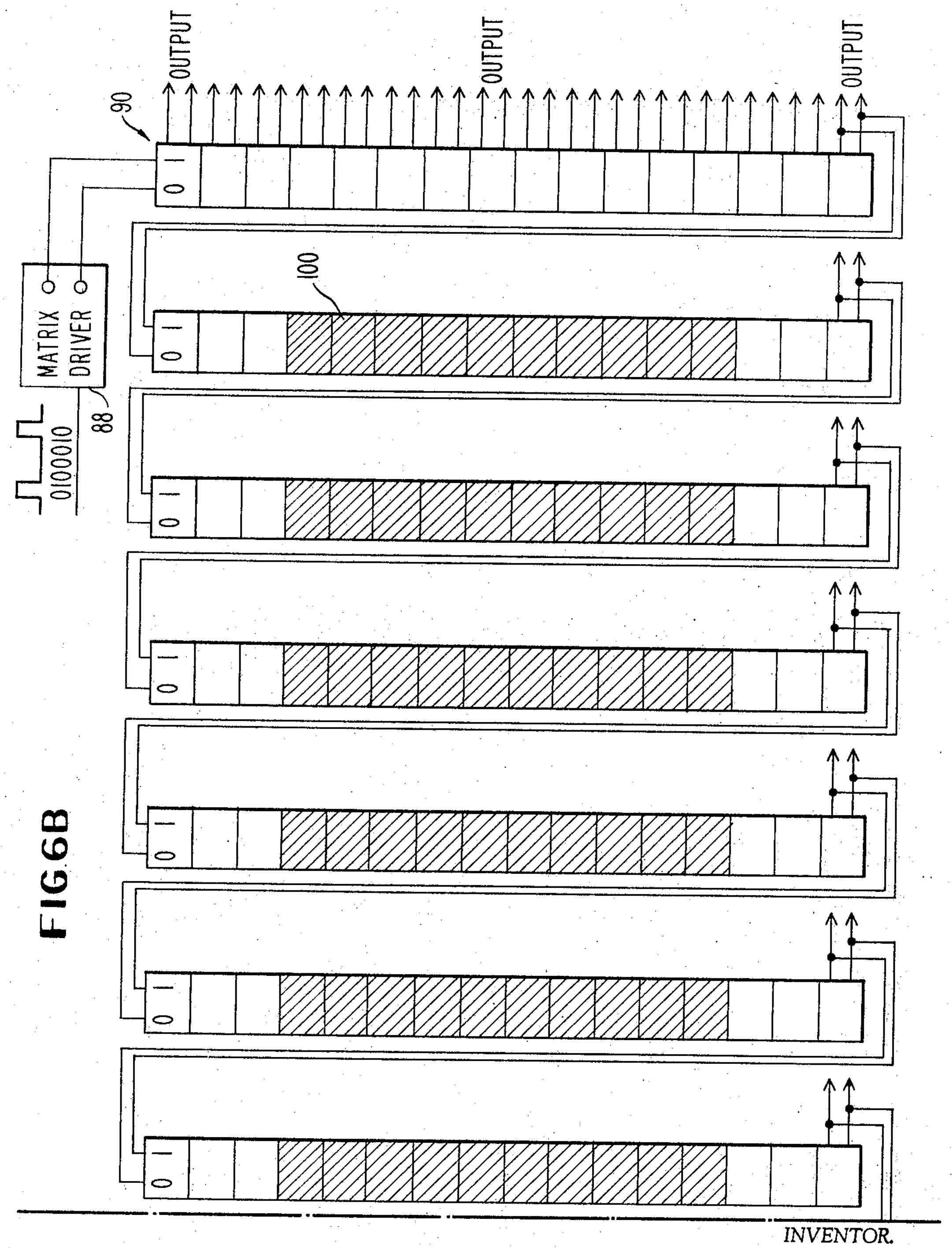
Figure 7:
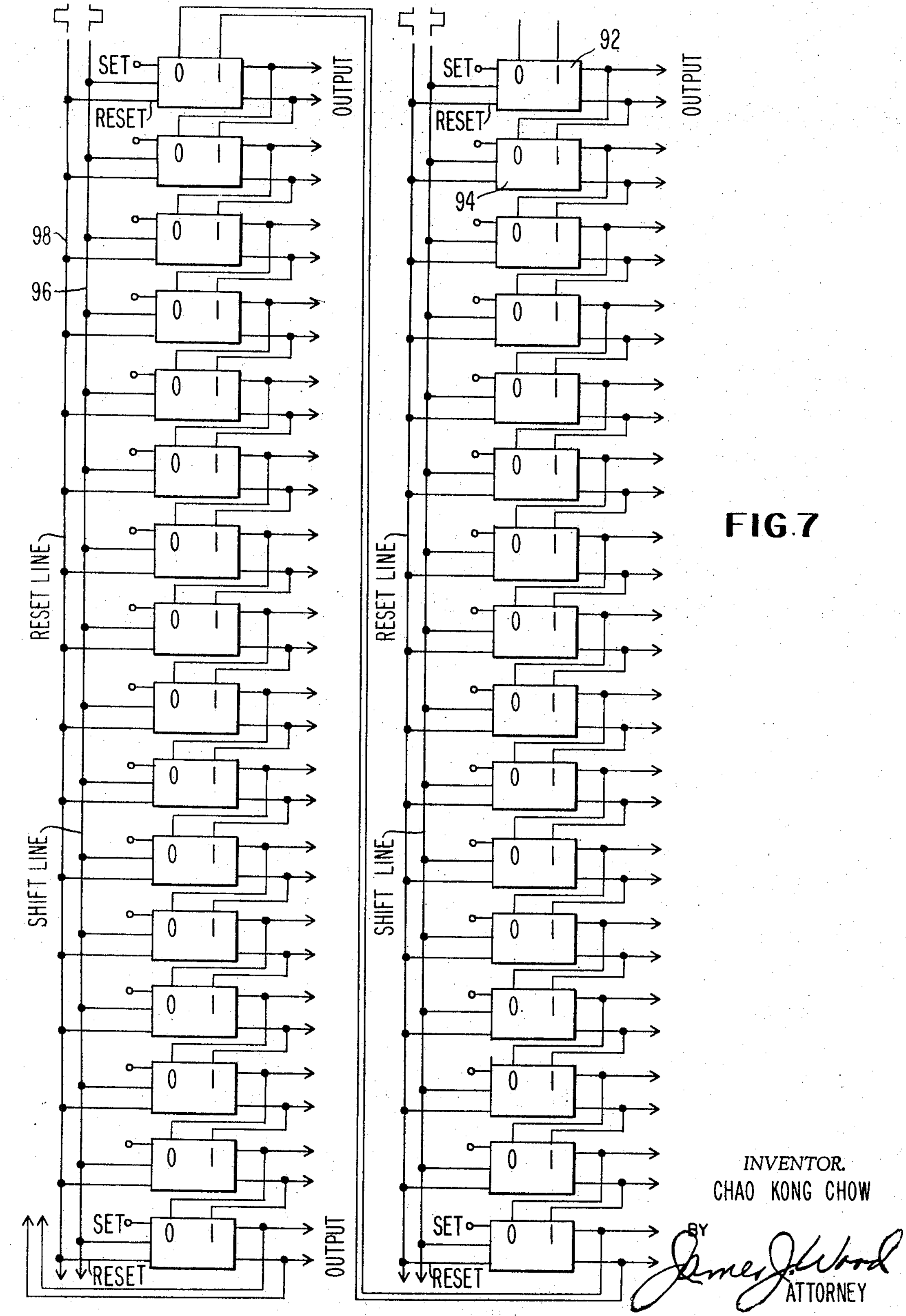
Figure 8:
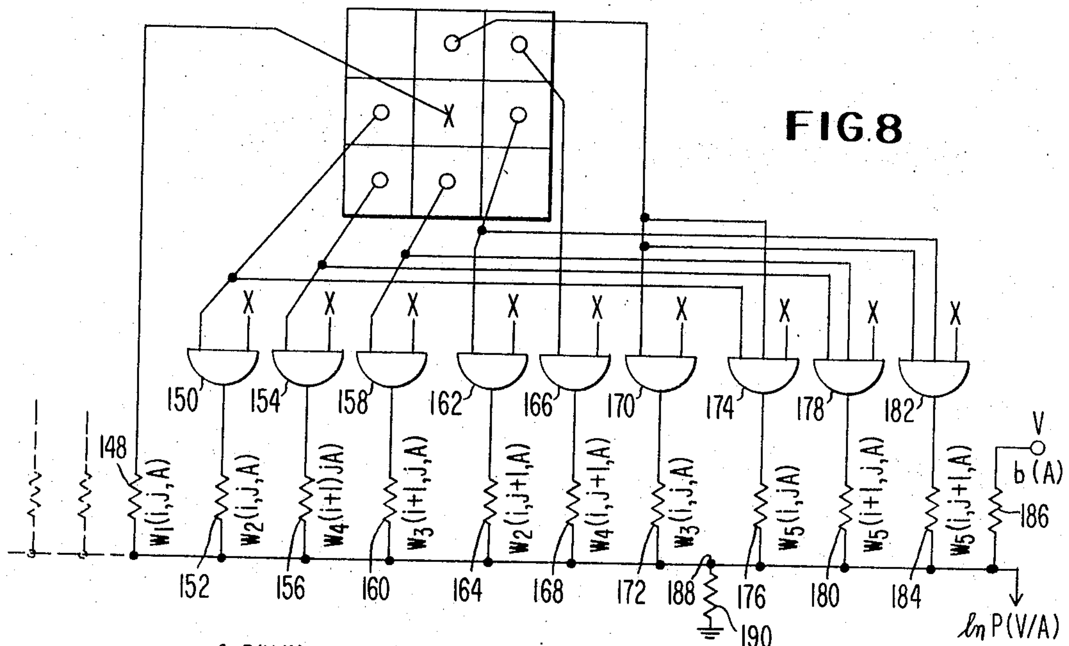
Figure 9:
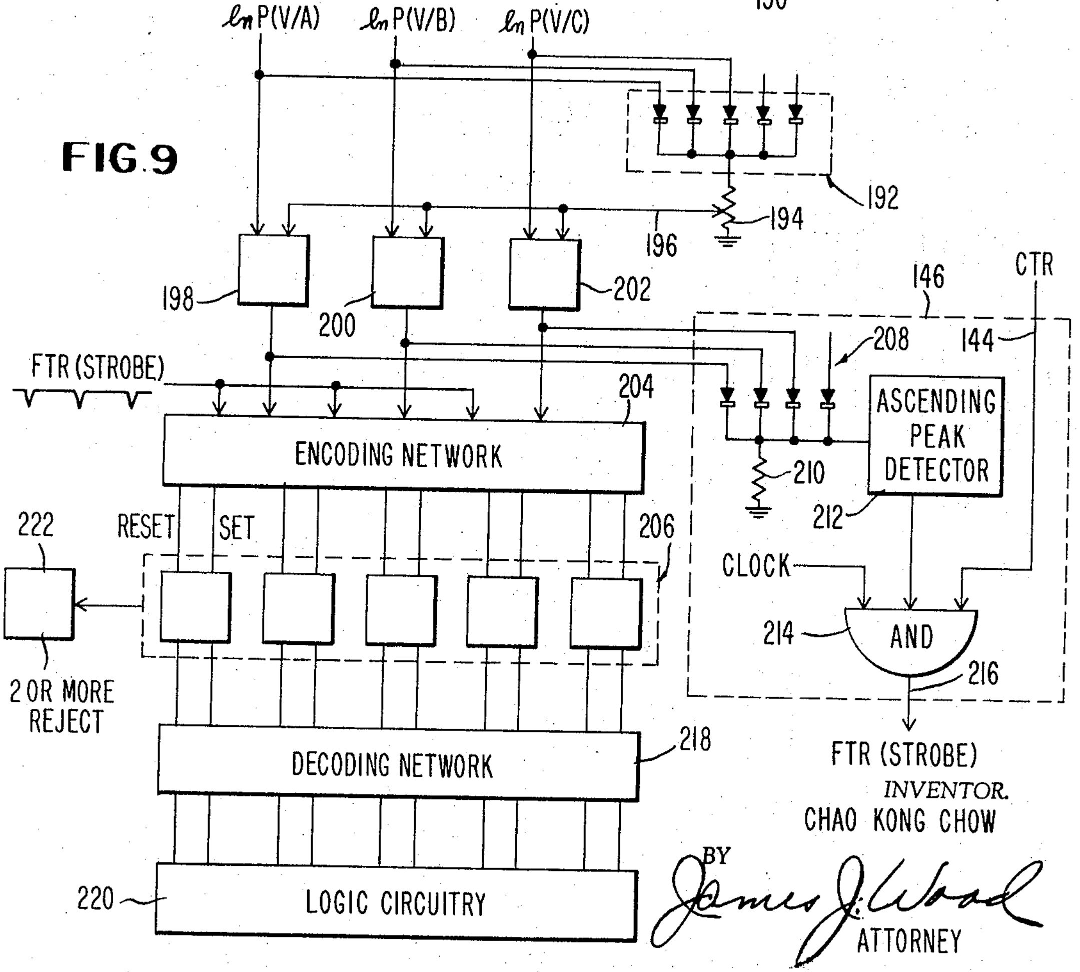

FIGS. 6A and 6B when arranged in the order indicated in FIG. 6 comprise a flow diagram of the marking shift register matrix for receiving and storing the digitized information together with the circuitry for developing the coarse timing reference signal;

FIG. 7 is a block diagram showing the marking shift register of FIG. 6 in greater detail;

FIG. 8 is a diagram in schematic form showing how the elemental areas for each character are combined to provide a probability signal; and FIG. 9 is a block diagram of the circuitry used to make the ultimate decision based on the highest probability signal.

Befort describing the illustrative embodiment it will be helpful to review the mathematics upon which the method of the instant invention is based.

*Mathematics*

The broad aspect of character recognition relates to the identification of characters—handwritten, printed or formed in any other suitable manner. Various solutions have been proposed, but these have been in specialized areas. For example, various font or symbols have been suggested to enable more exacting decision making. The most general solution should enable the recognization of any character in human language, be it printed, written or otherwise, regardless of printing irregularities (smudging, poor registration, etc.) or individual idiosyncrasies in forming handwritten characters.

A character to be identified is envisioned as comprising a matrix of various light or dark areas, say $n$ in number. In a practical situation, these $n$ areas are not independent of each other; each discrete area has a binary value denominated clear or dark, "ZERO" or "ONE" respectively, which is dependent upon its neighbors. A few examples will serve to point up these interrelations. If two adjacent areas are considered, the one being inked, and the other containing some ink due to smudging, then it may be said that the latter area would not contain ink but for its neighbor, and hence, it is dependent upon its neighbor as regards the binary condition of ink or no ink. Here of course, the smudged area represents noise. Similarly, if we have two elemental areas, not necessarily adjacent, the same neighbor dependence exists. Thus two areas may be both inked because a "5" is being printed, whereas the same discrete areas might bear the relationship of ink and no ink if some other character were being represented, say a "1."

This relationship of one area to another is not confined to adjacent areas, for every area comprising the entire matrix is related to every other area, and combinations thereof. Mathematically, the total number of groups which can be formed from $n$ things taken any number at a time from 1 to $n$ is:

$$2^n-1$$

Such number is astronomically large, and the purpose of this mathematics is to develop a minimum error-rate system which will handle a reasonable amount of information to enable an economical and practical mechanization of the problem.

The mathematics to follow is based on the assumption that we are given the characters A, B, C, D etc., and we are to find the signals associated with these characters. In the practical case the converse will be true—we will be given the signals and the problem will be to find the related character (this is decision making). These problems are the inverse of each other, and no difficulty will be encountered in converting from one to the other.

For simplicity we shall consider two ideal characters A and B. We define V as the signal derived from a printed character including the noise inherent in the printing process and the scanning device. Because of the presence of noise there can be a very large number of V's. The joint probability of V and A=

$$P(V,A)=P(A)\cdot P(V|A) \tag{1}$$

Similarly, the joint probability of V and B=

$$P(V,B)=P(B)\cdot P(V|B) \tag{2}$$

wherein P(V|A) means the conditional probability of V (given character A) and P(V|B) means the conditional probability of V (given the character B).

From the Bayes Theorem a minimum error rate system indicates that the most probable character based on examination of the received signal V is:

$$P(A|V)=\frac{P(V,A)}{P(V)}=\frac{P(V|A)P(A)}{P(V)} \tag{3}$$

$$P(B|V)=\frac{P(V,B)}{P(V)}=\frac{P(V|B)P(B)}{P(V)} \tag{4}$$

Because of the fact that P(V) is the same in each denominator, one need only determine the larger of P(V,A) and P(V,B).

Let:

$$A=a_{11}, a_{12}, a_{13}, \text{etc.} \quad B=b_{11}, b_{12}, b_{13}, \text{etc.} \quad V=v_{11}, v_{12}, v_{13}, \text{etc.} \tag{5}$$

where the representation of the characters A, B is a binary matrix $A=||a_{i,j}||$, $B=||b_{i,j}||$ where the elements $a_{i,j}$ and $b_{i,j}$ in the $i^{th}$ row and the $j^{th}$ column are ONE or ZERO respectively according to whether or not there is ink in the corresponding location of the original character. Similarly, the signal matrix $V=||v_{i,j}||$ where the signal has a binary weight of ONE or ZERO depending upon whether or not the locus, viz, from whence it was derived had ink or no ink. The portions of the signal $v_{11}$, $v_{12}$, $v_{13}$ are derived in any convenient manner, for example these voltages could be taken from taps along a delay line when a single signal is being propagated.

As previously stated, theoretically all points are dependent on all other points, but in a practical example the dependence will be restricted to a small number of points, in particular to the "nearest neighbors of that point." We shall now define the nearest neighbors which bound the point of interest.

Figure 2:
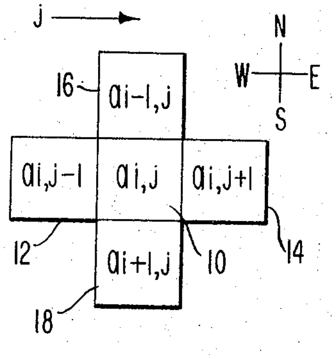
FIG. 2 is a diagram depicting the cordinate system utilized in identifying the elemental areas of the binary matrix.

Referring now to FIG. 2 in the most general case consider a locus 10 having the identification $a_{i,j}$. The $i$'s represent the rows and the $j$'s the columns. Thus the west and east neighbors to locus 10 are loci 12 and 14, having the coordinates $a_{(i,j-1)}$ and $a_{(i,j+1)}$ respectively. Similarly, the north and south neighbors of locus 10 are loci 16 and 18 having the coordinate dimensions $a_{(i-1,j)}$ and $a_{(i+1,j)}$ respectively.

Figure 3:
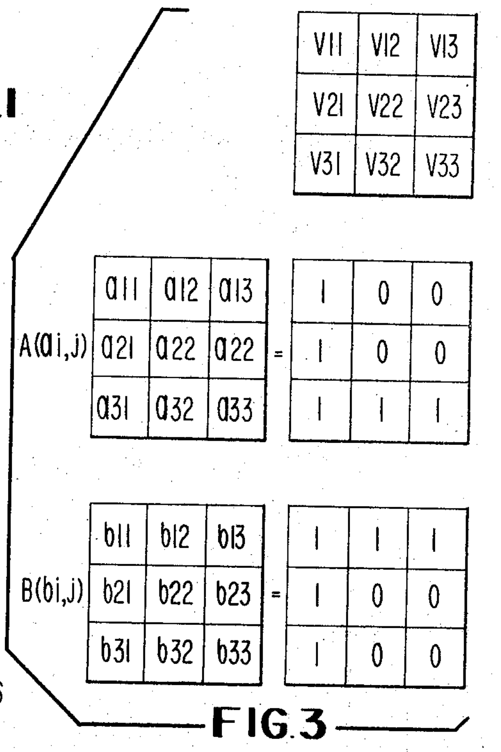
FIG. 3 is a block diagram used to further illustrate the coordinate system of FIG. 2.

This notation will be better understood by reference to FIG. 3. The characters A and B comprise elemental areas $a_{11}$, $b_{11}$, $a_{12}$, $b_{12}$, etc. The portions of the signal V derived from this matrix have a related numeration $v_{11}$ associated with elemental area $a_{11}$, or $b_{11}$, etc. These elemental areas are quantized to black or white ("1" or "0") respectively, as shown to the right of each respective matrix. Thus the signal derived from $a_{12}$ would be a ZERO while the signal derived from $b_{12}$ would be a ONE.

Note: In the illustrative embodiment the matrix will be $16\times10$ i.e., $i=1 \ldots 16$ and $j=1 \ldots 10$ making 160 elemental areas in all. By definition:

$$(6) \qquad P(V|A)=P(v_{11},v_{12} \ldots v_{i,j} \ldots |A)$$

This is the joint probability of $v$'s given A.

Because of the fact that the elemental areas are not independent the conditional probabilities P(V|A) etc. cannot be written as a product of unconditional probabilities and the following general mathematical form is required:

$$(7) \qquad P(V|A)=P(v_{11}|A)\cdot P(v_{12}|v_{11},A)\cdot P(v_{13}|v_{12}\cdot v_{11},A) \ldots P(v_{rs}|v_{r-1,s} \ldots v_{11},A)$$

where $r$ and $s$ denote respectively the numbers of rows and columns in the signal matrix.

Equation 6 states in words the conditional probability of observing the binary matrix V given that it represents the character A equals the joint probability of finding the $v$'s given the character is A. Equation 7 states in words that the conditional probability of observing the binary matrix V given that it represents the character A equals the conditional probability of finding $v_{11}$ for the character A times the conditional probability of finding $v_{12}$ after finding $v_{11}$ for the character A times the conditional probability of finding $v_{13}$ after finding $v_{12}$ and $v_{11}$ for the character A, etc., continuing through all the combinations to the conditional probability of finding the $v_{rs}$ for the character A, after ascertaining all the remaining $v$'s for the V matrix. Thus as will be observed in Equations 6 and 7, the successive terms are related to all previous terms. However, in order to reduce the number of terms to a reasonable number, we shall assume nearest neighbor dependence based on only those neighbors to the north and west of any point. Further, let $r\times s$ be the size of the array. The expression 7 then reduces to:

$$(8) \qquad P(V|A)=\pi_{\substack{1\leq i\leq r \\ 1\leq j\leq s}} P(v_{i,j}|v_{i,j-1};\ v_{i-1,j})A)$$

with the definition that:

$$(9) \qquad v_{0j}=v_{i0}=0, \text{ for all } i \text{ and } j$$

and (10)

$$P(v_{i,j}|v_{i,j-1},\ v_{i-1,j};\ A = \begin{cases} P(v_{11}|A) & \text{if } i=j=1 \\ P(v_{1j}|v_{1,j-1},\ A) & \text{if } i=1 \text{ and } j>1 \\ P(v_{i1}|v_{i-1,1},\ A) & \text{if } i>1 \text{ and } j=1 \end{cases}$$

The purpose of these definitions is to take into account the edges of the matrix that we have assumed. The general term in Equation 8 includes only the north and west neighbors (above and to the left); the other two neighbors are not explicitly needed. It will be observed from the mathematics that follows, the nearest neighbor dependence propagates through the matrix in this way.

Each of the terms in the expression for P(V|A) Equation 8 may be thought of as the probability that $v_{i,j}$ is black or white for the character A, when the signals of the two neighbors are known. Arbitrarily we can denominate the black state a ONE and the white or clear state a ZERO. As will be obvious from a moment's reflection, each of the north and west neighbors $v_{i-1,j}$ and $v_{i-1,j}$ to the general locus $v_{i,j}$ can be arranged in four combinations: 0,0; 0,1; 1,0; and 1,1. There are four of these combinations when $v_{i,j}$ is black (ONE) and four more combinations when $v_{i,j}$ is white (ZERO). There are thus eight possible cases for each point of interest. These combinations are arranged in tabular form in table below:

TABLE I

| Point of Interest $v_{i,j}$ | Nearest Neighbors $v_{i,j-1}$ | $v_{i-1,j}$ | m | $P(v_{i,j}\|v_{i-1,j};\ v_{i,j-1},A)$ |
|---|---|---|---|---|
| (1) 0 | 0 | 0 | 0 | $\beta_0(i,j,A)$ |
| (2) 0 | 0 | 1 | 1 | $\beta_1(i,j,A)$ |
| (3) 0 | 1 | 0 | 2 | $\beta_2(i,j,A)$ |
| (4) 0 | 1 | 1 | 3 | $\beta_3(i,j,A)$ |
| (5) 1 | 0 | 0 | 0 | $\gamma_0(i,j,A)$ |
| (6) 1 | 0 | 1 | 1 | $\gamma_1(i,j,A)$ |
| (7) 1 | 0 | 0 | 2 | $\gamma_2(i,j,A)$ |
| (8) 1 | 1 | 1 | 3 | $\gamma_3(i,j,A)$ |

For convenience in the mathematics to follow some new definitions will be introduced. These new designations will now be defined:

The symbol $m$ designates the state of the two nearest neighbors, and is the decimal equivalent of the binary code formed by $v_{i-1,j}$ and $v_{i,j-1}$, where the neighbors have the weighted decimal values $2^0$ and $2^1$ respectively.

$$(11) \qquad \beta m=P(v_{i,j}|v_{i-1,j},\ v_{i,j-1};\ A)$$

where $\beta m$=the probability that the signal for the point of interest ($v_{i,j}$) is white (0) when the nearest neighbors have the binary combination indicated by the subscript $m$. In the table the four possibilities are indicated as $\beta_0$, $\beta_1$, $\beta_2$, and $\beta_3$. Similarly, $$(12) \qquad \gamma m=P(v_{i,j};\ v_{i-1,j};\ v_{i,j-1};\ A)$$

where $\gamma m$=the probability that the signal for the point of interest ($v_{i,j}$) is black (1) when the nearest neighbors have the binary combination indicated by the subscript $m$. In the table these four possibilities are indicated as $\gamma_0$, $\gamma_1$, $\gamma_2$, and $\gamma_3$. From the probability mathematics $$(13) \qquad \beta m(i,j,A)+\gamma m(i,j,A)=1$$

Hence it is only necessary to find $\gamma m$ or $\beta m$:

$$(14) \qquad \gamma m(i,j,A)=1-\beta m(i,j,A)$$

At this point it will be noted that in the practical embodiment to be described either $\beta m$ or $\gamma m$ will be found statistically from a study of a great number of characters to be recognized. Using the $\gamma m$ and $\beta m$ notation it is possible to rewrite Equation 8 as follows:

$$(15) \qquad P(v_{i,j}v_{i,j-1};\ v_{i-1},A)=$$

$$\left\{\beta_0(i,j,A)\cdot\left[\frac{\gamma_0(i,j,A)}{\beta_0(i,j,A)}\right]^{v_{i,j}}\right\}^{(1-v_{i,j-1})(1-v_{i-1,j})}$$

$$\left\{\beta_1(i,j,A)\cdot\left[\frac{\gamma_1(i,j,A)}{\beta_1(i,j,A)}\right]^{v_{i,j}}\right\}^{(1-v_{i,j-1})(v_{i-1,j})}$$

$$\left\{\beta_2(i,j,A)\cdot\left[\frac{\gamma_2(i,j,A)}{\beta_2(i,j,A)}\right]^{v_{i,j}}\right\}^{(v_{i,j-1})(1-v_{i-1,j})}$$

$$\left\{\beta_3(i,j,A)\cdot\left[\frac{\gamma_3(i,j,A)}{\beta_3(i,j,A)}\right]^{v_{i,j}}\right\}^{(v_{i,j-1})(v_{i-1,j})}$$

A circuit to represent the general Expression 15 can be more easily fabricated if the logarithm is taken of both sides of the equation. Arbitrarily in this case the natural logarithm has been chosen although the logarithm to any base would suffice. The result after some algebraic manipulation is:

(16)

$$T(V|A)=\ln P_A(Pv|A)=b(A)+\sum_{i,j}w_1(i,j,A)v_{i,j}$$
$$+\sum_{i,j}w_2(i,j,A)(v_{i,j})(v_{i,j-1})$$
$$+\sum_{i,j}w_3(i,j,A)(v_{i,j})(v_{i-1,j})$$
$$+\sum_{i,j}w_4(i,j,A)(v_{i,j-1})(v_{i-1,j})$$
$$+\sum_{i,j}w_5(i,j,A)(v_{i,j})(v_{i,j-1})(v_{i-1,j})$$

where summation indicates $i$ and $j$ run through the entire character field from 1 to $r$ and $s$ respectively. The bias weight $b$(A) and weights $w$'s given by the following equations:

(17) $$b(A)=\ln P_A+\sum_{i,j}\ln \beta_0(i,j,A)$$

(18)

$$w_1(i,j,A)=\ln\frac{\gamma_0(i,j,A)\beta_2(i,j+1,A)\beta_1(i+1,j,A)}{\beta_0(i,j,A)\beta_0(i,j+1,A)\beta_0(i+1,j,A)}$$

(19) $$w_2(i,j,A)=\ln\frac{\beta_0(i,j,A)\gamma_2(i,j,A)}{\gamma_0(i,j,A)\beta_2(i,j,A)}$$

(20) $$w_3(i,j,A)=\ln\frac{\beta_0(i,j,A)\gamma_1(i,j,A)}{\gamma_0(i,j,A)\beta_1(i,j,A)}$$

(21) $$w_4(i,j,A)=\ln\frac{\beta_0(i,j,A)\beta_3(i,j,A)}{\beta_1(i,j,A)\beta_2(i,j,A)}$$

(22)

$$w_5(i,\ j,\ A)=\ln \frac{\gamma_0(i,j,A)\beta_1(i,j,A)\beta_2(i,j,A)\gamma_3(i,j,A)}{\beta_0(i,j,A)\gamma_1(i,j,A)\gamma_2(i,j,A)\beta_3(i,j,A)}$$

To accommodate the boundary points the following definitions are used:

(23) $$\frac{\beta_2(1,s+1,A)}{\beta_0(1,s+1,A)}=1$$

(24) $$\frac{\beta_1(r+1,j,A)}{\beta_0(r+1,s,A)}=1$$

Some observations concerning the expressions in the right-hand side of Equation 16 will now be made.

The first expression $b$(A) is a constant, and may be evaluated by means of Equation 17. The second expression represents the point of interest $v_{i,j}$ multiplied by the weighted value as indicated by the expression for the evaluation of $w_1$ $(i,j,A)$ in Equation 18. The third expression represents the product of the point of interest $v_{i,j}$ and its west neighbor $v_{i,j-1}$ multiplied by the weighted value as indicated by the expression for $w_2$ $(i,j,A)$ in Equation 19. The fourth expression represents the product of the point of interest $v_{i,j}$ and its neighbor to the north $v_{i-1,j}$ multiplied by the weighted value for $w_3$ as indicated in Equation 20. The next expression is the product of the west and north neighbors $v_{i,j-1}$ and $v_{i-1,j}$ respectively, multiplied by the weighted value for $w_4$ as evaluated by means of Equation 21. The final expression represents the product of the point of interest $v_{i,j}$ and its west and north neighbors $v_{i,j-1}$, $v_{i-1,j}$ multiplied by the weighted value $w_5$ as evaluated by Equation 22.

It should be understood that the above mathematical analysis is for a single character or pattern to be recognized. Similar mathematics are required for each character or pattern to be identified.

*Illustrative embodiment*

Figure 1:
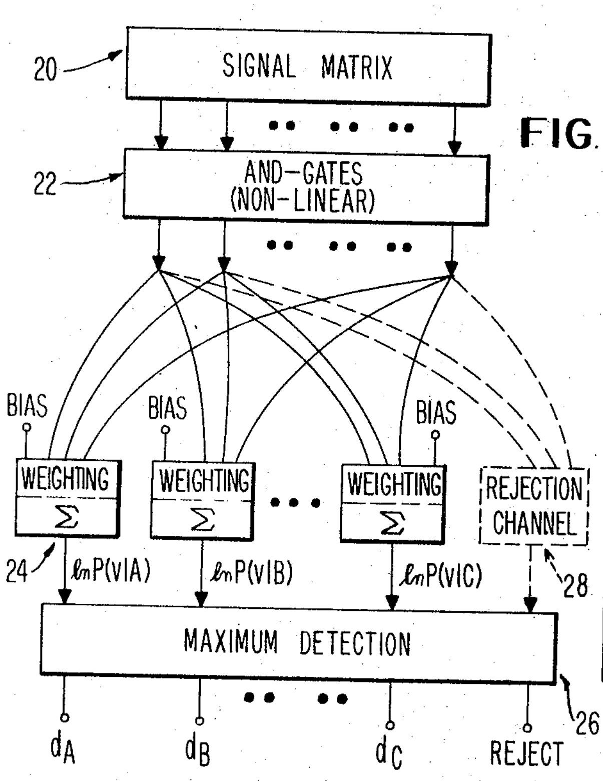
FIG. 1 is a block diagram illustrating in broad outline the apparatus for practicing the method of the instant invention.

In order to understand the operation of the invention shown in FIG. 1, it will be helpful to understand the manner in which the circuitry is designed. The approach which has been taken views the character recognition task as a problem in statistical decision theory. Accordingly, a great number of samples of the characters or patterns to be recognized are gathered for examination; these samples comprise not only those with good or ideal printing format, but also includes those samples which have in fact been smeared, splattered, erased in part, or in other ways altered from the ideal state, so as to create additional noise distortion. These printing specimens are representative of the characters which the device is expected to recognize.

For the purpose of scanning and recognition, each character is considered as comprising a matrix of various light and/or dark areas. In the embodiment herein described, the character is divided into a hundred and sixty small blocks or elemental areas, each block being illuminated in predetermined order, the light emanating from each block being measured. An elemental area in a very heavily printed part of a character may for example, have a reflectance value of 6, and in a more lightly printed part, have a value of 20, while still another area in the unprinted portion of the character may have a value of 60. These elemental areas are then quantized into a matrix of black of white to provide the identification signals.

In the FIG. 1 embodiment the signal matrix is indicated symbolically at 20. In the next phases indicated generally at 22 and 24 respectively, the conditional probabilities of the input pattern are calculated, one for each character to be identified. This results in a probability matrix, for each type of character in the set of interest. In the phase 22 the signal information is applied to a complex of AND gates, the discrete signal inputs to the respective AND gates being arranged on the basis of the technique of neighborhood intelligence dependence. The outputs of the AND gates are applied to the weighting networks indicated at 24, there being one weighting network for each character to be recognized, viz., A, B, C . . . Z, 0, 1, 2, . . . 9 etc. The final or recognition phase consists of recognizing the unknown character samples. The character samples to be recognized can be either those which were used to calculate the probability matrices in the first instance or preferably they can be new characters to be identified.

The maximum selection phase indicated generally at 26 comprises a maximum detection which selects the maximum probability decision for recognition. In more specific terms this means that the channel having the highest probability will be recognized as the particular character undergoing identification.

Provision is also made for rejection (indicated generally at 28) to establish a rejection criterion which must be a measure of the risk involved in the recognition decision. The effect is to inhibit the recognition decision when the probabilities for a particular sample do not clearly imply a single character. Stated differently, this may happen where the indicated probabilities are within a certain magnitude of each other, and the attempted decision would involve too great a risk, and therefore rejection is chosen.

The detailed structure of the recognition system depends upon the apriori distribution of characters, and conditional probability distribution of patterns. (A character is considered as a class of patterns, such that all patterns in that class are identified as that character.)

The physical realization of the block diagram of FIG. 1 is shown in more elaborate form in FIGS. 4 to 9. In contemplation of this invention the document is scanned by a flying spot scanner, although any other suitable device for dividing the area into a matrix of elemental areas and deriving binary information therefrom would be equally satisfactory. For this purpose any type of optical scanner could be utilized which serves to image the pattern onto a surface where it is subsequently scanned.

Figure 4:
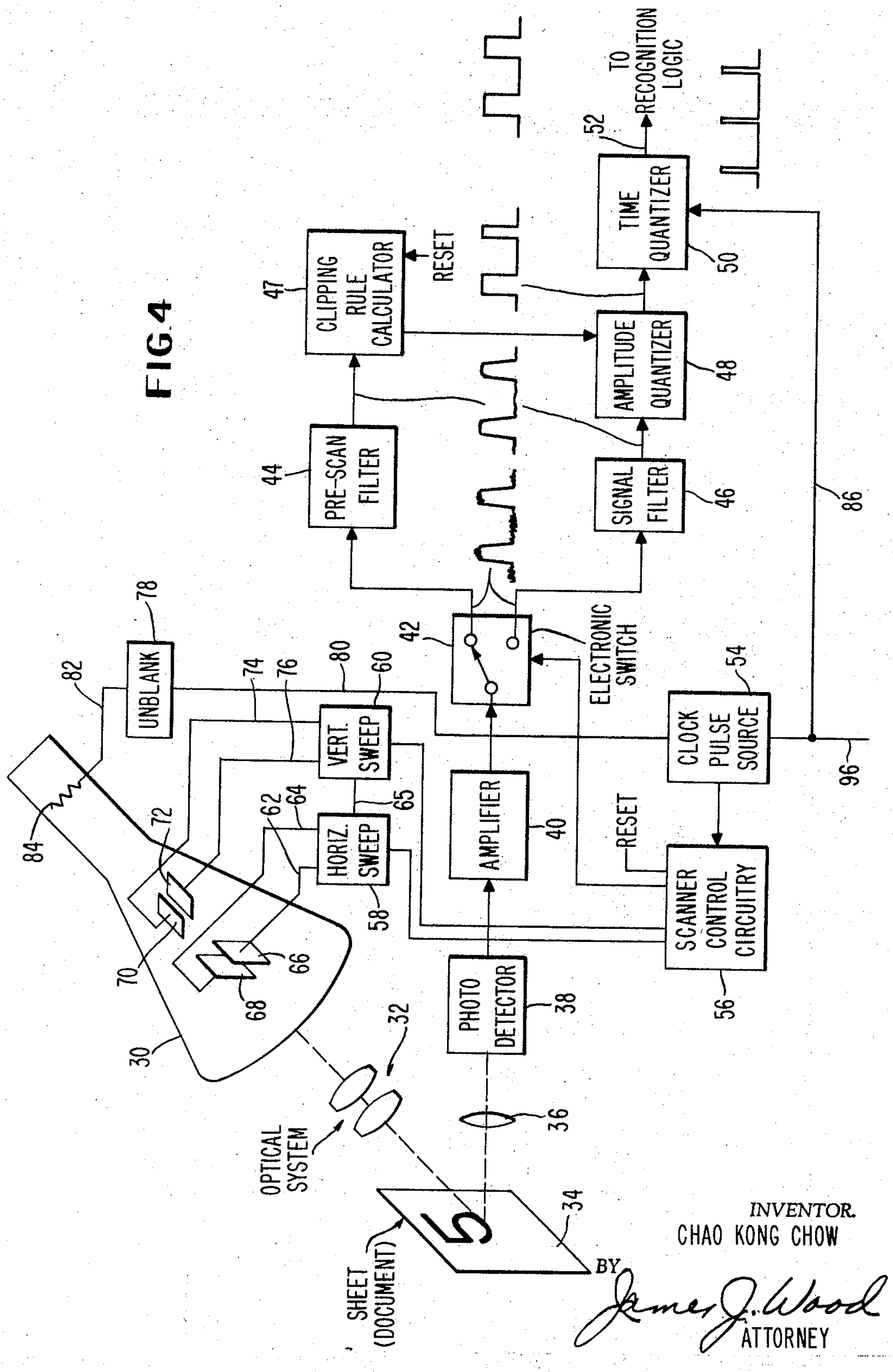
FIG. 4 is a schematic flow diagram of the scanning circuitry.

In the embodiment of FIG. 4, the scanning unit is a standard flying spot scanner with a high degree of resolution and a short persistence. A cathode ray tube is indicated at 30. A spot of light on the fluorescent screen of the cathode ray tube 30 is produced by means of a beam which is focused by a lens system 32 onto a document 34, which contains the alpha-numeric characters or other pattern to be identified. The reflected light from the document 34 is focused by an additional lens system 36 to a photodetector indicated in block form at 38. The photodetector 38 may be any transducer device for converting the light energy into electrical energy, and may for example, conveniently be a photomultiplier tube. The photodetector 38 produces an output signal which is fed to an amplifier indicated generally at 40; the amplifier 40 may comprise one or more amplification stages as required. The output from the amplifier is fed to an electronic switch indicated symbolically at 42, from whence it is fed successively to a pre-scan filter 44 and a signal filter 46 depending upon the position of the electronic switch 42. From the pre-scan filter 44 the signal is fed to clipping rule calculator circuit indicated generally at 47; the signal from the clipping rule calculator is fed to an amplitude quantizer circuit indicated in block form at 48, and finally, the amplitude quantizer is fed to a time quantizer 50. The output from the time quantizer is taken between line 52 and ground and applied to the recognition logic circuitry, shown in FIGS. 6–9.

The sweep of the flying spot of the cathode ray tube 30 is controlled by means of a clock source 54 and the scanner control circuitry 56, the latter being connected to the horizontal sweep generator and the vertical sweep generator indicated respectively at 58 and 60. The horizontal sweep generator is connected by means of lines 62 and 64 to the horizontal deflection plates 66 and 68 respectively. The vertical sweep generator is connected to the vertical deflection plates 70 and 72 by means of lines 74 and 76 respectively.

The clock pulse source 54 is connected to an unblank circuit 78 by means of line 80; in turn the unblank circuit 78 is connected by means of line 82 to the grid 84 of the cathode ray tube 30. The clock pulse source 54 is also connected by means of line 86 to the time quantizer circuit 50.

Figure 5:
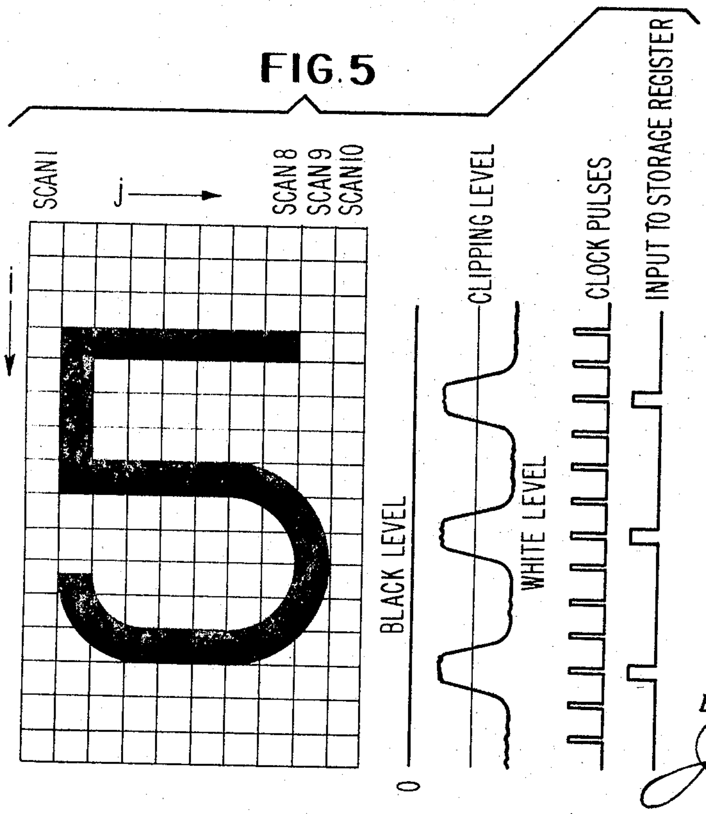
FIG. 5 is a diagram for the signal matrix together with a number of wave patterns resulting from one scan of the numeral "5"

Before proceeding with a description of the remaining circuitry, it will be helpful to understand at this point how the binary signal data is collected. Referring now to FIG. 5, there is shown to the left a grid 16 x 10, comprising 160 elemental areas. The numeral "5" has been superimposed on this grid; this is the same numeral 5 that appears on the sheet or document 34, and is used here for purposes of illustration.

The pattern to be recognized thus comprises a number of white and black areas, which is practice are not nearly as perfect as the ideal character which has been shown in the figure—some smudging, spattering of ink, etc., is inevitable, so that the signal which is derived will include noise.

Because of the fact that the light reflected from an inked or black area of the document is less than that reflected from an uninked or white area, a smaller signal will be produced by the black area. In the illustrative embodiment herein described, arbitrarily the black signal will be at zero or ground potential while the white will be at some negative potential.

The beam produced by the spot of light is moved stepwise vertically by the vertical deflection generator 60 acting by means of leads 74, 76 on the vertical deflection plates 70, 72. The beam is likewise moved stepwise horizontally by means of a horizontal deflection generator 58 controlled by means of leads 62, 64 from the scanner control 56. As will be seen in FIG. 5, the beam will start at the lower lefthand reference position and move upwards, the vertical deflection sweep generator 60 causing the beam to move vertically upward on the face of the scope in thirty-two discrete steps. Even though the presence of black or white is determined at each of the thirty-two discrete steps, only sixteen or every other one of the thirty-two is utilized in the recognition scheme which will presently be described, so that in all sixteen bits are provided per vertical sweep. The beam is not moved continuously because of the problem of phosphor persistence of the spots of light on the cathode ray tube screen. The unblank circuit 78 is connected to control grid 84 and is controlled by the clock source 54 by means of leads 80 to permit the beam to place the spot of light on th cathode ray tube screen only during a portion of time that the beam is at rest.

The scanning process normally begins with the spot of light at the lower position. Upon reaching the top of the vertical scan, the vertical sweep generator 60 resets the beam to the lower position, and by means of lead 65 (FIG. 4) steps the horizontal sweep generator 58 to cause the next scan to begin one horizontal step to the right of the previous vertical scan, the vertical scanning process continuing across the characters from left to right until the scanning is completed.

The light and dark areas from the document are focused by the lens system 36 on the photodetector 38 which produces an output signal which is a function of the quantum of light which strikes the detector. At amplifier 40, the signal is amplified and some limiting may be done at this point. The amplified signal is next switched to one of two possible paths by means of the electronic switch 42. In the practice of the instant invention a pre-scanning step is first performed to provide a threshold level signal for the amplitude quantizer 48. The amplified signal is fed to a pre-scan filter 44 where much of the noise in the signal is eliminated. The filtered signal is next passed on to the clipping rule calculator 47 which determines the threshold level based on the general blackness of the character to be recognized; here the blackness of the character is evaluated, and a clipping level is established. Any one of a great number of such circuits may be used; in this embodiment a quadratic calculation of a maximum white signal and a maximum black signal is developed to provide a threshold adjustment signal which is sent to the amplitude quantizer 48.

When the pre-scan step is completed, the cathode ray tube 30 duplicates the scanning of the document, and the same binary information is generated. However, at this time the scanner control circuitry 56 sends a control signal to the electronic switch 42 which causes the information to be passed to a signal filter 46, where again certain noise frequencies are filtered out, and the filtered signal is passed on to the amplitude quantizer 48. The amplitude quantized signal is sent to the time quantizer which acts in cooperation with the clock pulse source 54 to produce the binary bits on line 52 which are sent to the recognition logic.

As will be seen in both FIGS. 4 and 5, the signals from the scanning circuit are now in digitized form, and these are passed successively, as shown in FIG. 6B, to a matrix driver 88 and a shift register indicated generally at 90.

The shift register is shown in somewhat greater detail in FIG. 7 and comprises a plurality of bistable elements 92, 94 etc. arranged as shown. In the embodiment here illustrated, each bistable element comprises a transistorized Eccles-Jordan flip-flop arranged to receive as inputs, a ZERO, a ONE, SET, RESET, and SHIFT pulse signals respectively. Appropriate output leads are also provided for detecting the ONE or ZERO as the case may be, for utilization as output signals. The shift signals are applied by means of line 96, the shift pulse signals being derived from the clock source 54. A RESET signal is applied to the shift register by means of line 98 at the conclusion of the recognition.

In FIG. 6 some of the shift and reset lines have been eliminated in order to clarify the drawing. The information fed into the matrix driver 88 is then shifted through the register in turn so that when at the conclusion of the scanning process, the various bistable elements (in this particular embodiment 160 flip-flops in all) will contain the same information as the character scanned; that is, designating a black or inked area as a ONE and a white or clear area as a ZERO, the bistable elements of the shift register will be in the appropriate ONE or ZERO states so as to substantially conform to the configuration of a numeral "5." The main information from the character will be contained in the center lying 8 x 10 flip flops indicated in FIG. 6 by the lightly cross-hatched area and identified generally at 100.

For centering or aligning the character to be identified a coarse timing reference signal is developed. Summing networks are provided for the border and information areas. The summing network for the border area is indicated generally at 102, and the summing network for the information area 100 is generally shown at 104. The network 102 comprises a plurality of resistors 106, 108, 110, 112, 114, 116 etc. Resistor 106 is connected to a biasing source indicated at +E, the remaining resistors 108 to 116 are connected to the flip-flops at the left and bottom of information area 100 as viewed in FIGS. 6A and B. These resistors 108–116 etc. develop a voltage across output resistor 118, which is connected between their summing point and ground, the output signal having been developed when the sum of the input voltages exceeds that of the bias potential +E; this gives an indication that sufficient white or clear is present around the periphery of the information matrix 100.

The resistors 120, 122, 124, 126, 128, 130, 132 etc. are similarly connected to selected flip-flops within the information matrix 100. Resistor 120 is connected to a biasing potential indicated at +E. When the general black level within the 8 x 10 matrix 100 reaches a level which overcomes the biasing potential +E, a voltage is developed across resistor 134 which is connected between their summing point and ground. These two signals then state in effect that there is sufficient "white" background around the periphery of the 8 x 10 matrix and sufficiently "black" within the 8 x 10 matrix that it is time to begin identifying the character.

The manner of connecting the resistors 108–116 etc., and 122–132 etc., to the respective flip-flops is a matter of choice. Consider a transistorized flip-flop in the grounded emitter configuration having transistors Q1, Q2. If the ZERO or white state is defined as Q1 ON and Q2 OFF, the respective collectors of the transistors will be at say −7 v. and ground. The converse is then true for the ONE or black state: Q1 is ON and Q2 is OFF so that the respective collectors are at ground and −7 v. Obviously, in seeking to identify the state of a flip-flop there is a choice of monitoring points. In the embodiment here illustrated the resistors 108–116 are connected to the collectors Q1 and this potential will be −7 v. if the flip-flop is in the ZERO state. Similarly, resistors 122–132 are connected to the transistors Q2 and this potential will be −7 v. if the flip-flop is representing ONE or black. If for some reason it is not possible to connect to Q2 then resistors 122–132 could be connected to Q1; however, in this latter contingency resistor 120 would have to be connected to a source of negative potential (−E) and an inverter (shown in phantom block form 142 in FIG. 6A) would be necessary.

The signal across resistor 118 is passed to a D-C level standardizer 136 and then to an AND gate indicated generally at 138. The signal across resistor 134 is also passed first to a D-C level standardizer 140 then to an inverter 142 (if required) and then to the AND gate 138. The presence of the both signals at the AND gate 138 sends an output signal through line 44 to the fine timing reference indicated generally at 146.

The outputs from the shift register 90 are also applied to a series of AND gates as will be explained in connection with FIG. 8. In order to mechanize the Equation 16 the outputs from the shift register are applied to a plurality of AND gates. For the purpose of clarification, in the diagram of FIG. 8 there are only nine flip-flops shown, the center one for explanatory purposes being marked "X." The output from flip-flop or bistable element X is applied through a weighting resistor, and then combined with other neighboring flip-flops in six 2-input gates, and three 3-input gates as shown. For example, the output from the center flip-flop "X" is passed through weighting resistor 148 having a weight $w_1$ as shown. The output from the center register "X" is combined with its west neighbor in AND gate 150, the output of the gate passing through resistor 152 having the weight $w_2$ as shown. Similarly, the outputs of the other flip-flops or bistable elements are combined in AND gates 154, 158, 162, 166, 170, 174, 178 and 182, the gated outputs being passed through weighting resistors 156, 160, 164, 172, 176, 180, 184 having the weights $w_4$, $w_3$, $w_2$, $w_4$, $w_3$, $w_5$, $w_5$ and $w_5$ respectively.

The constant term $b(A)$ in Equation 16 is realized by means of a resistor 186 which is connected to a biasing source $v$ (unnumbered) and to the summing point 188; the output is developed between summing point 188 and ground by means of resistor 190; the output being an electrical signal which is a function of the $1n\ P(V|A)$. A similar network is developed for each character to be identified and the signal to be identified is applied then to every network (one for each character to be recognized) simultaneously.

In FIG. 9 there is shown the remainder of the circuitry. The signal which is developed at each weighted network is applied to a diode peak detector indicated generally at 192; the detector comprises a plurality of diodes the anodes of which are connected to the weighted network signal lines respectively and the cathodes of which are connected in common. A peaked signal is developed between this common connection and ground by means of resistor 194. A portion of this voltage signal appearing across resistor 194, is taken by means of tap 196, and applied as one input to a plurality of difference amplifiers at 198, 200 etc., respectively. The signal from the various weighting networks is also applied directly as the other input to the respective difference amplifiers.

The outputs from the difference amplifiers 198, 200 and 202 are applied to an encoding network indicated in block form at 204. The particular signal encoded in this network 204 is applied to a binary register indicated generally at 206. The output from the difference amplifiers 198, 200 and 202 is also applied to a diode peak detector in the fine timing reference circuit 146, the diode peak detector being indicated generally at 208. In this diode peak detector the anodes are connected to the output of the respective difference amplifiers, while the cathodes are connected in common. The output of the peak detector 208 is developed across resistor 210 as shown, and is applied to an ascending peak detector 212; the output of the ascending peak detector 212 is applied in the form of a D-C level to a three input AND gate indicated at 214. With the coincidence of all three inputs: clock pulse, coarse timing signal and D-C level, the AND gate 214 develops a fine timing reference or strobe signal on line 216.

Completing the description of FIG. 9, the output of the binary register 206 is applied to a decoding network 218, from whence one channel representing one character is identified and applied to any suitable logic circuitry 220.

The operation of the device after the information is placed in the shift register (FIGS. 6A, 6B: 90) will now be explained. The coarse timing reference signal (CTR), is developed as previously indicated and it is applied by means of line 144 to the AND gate 214. In the meantime the clock pulses are also applied from the clock source 54 to the AND gate 214. The AND gate 214 of course will not deliver an output (FTR) on line 216 unless all three inputs are present. The channel representing the character to be identified will have a signal which will be the highest probability, i.e., the largest signal. The signals on the various channels are constantly applied to the cooperating difference amplifiers. The outputs of the difference amplifiers are applied to the diode peak detector 208. The output of the peak detector 208 is developed across resistor 210 for application to the ascending peak detector 212, which latter circuitry provides a D-C level signal as one input to the AND gate 214. The rationale for determining the optimum time at which the decision should be made in order to recognize a character to be identified is described more fully in the copending appliction of Chow and Rosenberg, entitled, "Graphic Character Recognition," Ser. No. 850,443, filed Nov. 2, 1959. Briefly, the ascending peak detector 202 develops a peak voltage waveform at each peak of its input, always ignoring peaks which are smaller than the largest preceding peak; this derived voltage waveform is a function of the application of the signal to be identified to all the weighting networks. Every time that a peak voltage is developed which is larger than its predecessor, the ascending peak detector sends a D-C level to the AND gate which provides a fine timing reference signal (FTR) or strobe on line 216. The strobe signal is applied then to the encoding network 204 which then sets the appropriate bistable elements of register 206. The number of bistable elements in the binary register 206 depends on the number of characters to be identified or encoded. For example, if four bistable elements are used, then two to the 4th power or sixteen characters can be set in coded form. The fine timing reference signal or strobe then enables the encoding network continuously each time a peak signal appears which is larger than its predecessor. If one smaller appears of course, no fine timing reference signal is generated, because the ascending peak detector 202 will not send a D-C level to the AND gate 214. The situation continues up to the end of the duration of the coarse timing reference signal (CTR), at which time the AND gate 214 can no longer provide an output (FTR). The binary register 206 is connected to a two or more reject circuit 222 which sends a reject signal to appropriate circuitry whenever any bistable element receives an ambiguous instruction; for example, when a flip-flop simultaneously receives set and reset signals.

One final example may serve to further clarify the operation of the device. Suppose for example, the coarse timing reference signal (CTR) is generated, and the signal having the highest probability appears on the channel identified with a "3." The ascending peak detector 212 would have developed a peaked waveform and sent a D-C level to the AND gate 214. The fine timing reference signal (FTR) would enable the encoding network and a "3" would be encoded in the binary register 206. A short time later, still within the time duration of the coarse timing reference signal (CTR) it may appear that the B channel has the highest probability, and another peak would be developed, and a D-C level sent to the AND gate 214; the fine timing reference signal (FTR) would enable the encoding network 204 and the encoding network would send signals which would write on top of the previous information in the binary register 206 thus, in effect, erasing it and the register 206 would be arranged in coded form to represent the character B. Finally, another and larger peak may come along and similarly the ascending peak detector would develop another D-C level signal for the AND gate 214 and the FTR or strobe signal would again enable the encoding network setting the register 206 for the new signal which might be an 8. If no other peak larger than the 8 signal appeared during the coarse timing reference interval then no other fine timing reference signal would be generated. The coarse timing reference signal would then terminate, and the AND gate 214 would be inhibited. The binary register 206 would represent an 8, in code, which is then decoded by the network 218 and sent to the logic circuitry 220 which is properly gated so as to remember only the last identification, which in this hypothetical case was the numeral 8.

Obviously, many modifications and variations of the present invention are possible in the light of the above teachings. It is therefore to be understood that within the scope of the appended claims, the invention may be practiced other than as specifically described and illustrated.

What is claimed is:

1. Apparatus for identifying alpha-numerical characters or other font comprising:

(a) means for arranging characters or other font to be identified in a matrix of $r$ rows and $s$ columns of elemental areas, the location $(i, j)$ being in the $i$th row and the $j$th column, (b) means for determining by neighborhood dependence, every alpha-numerical character to be recognized (A, B, C . . . 1, 2, 3 . . . etc.) including means for determining the conditional probability of observing a signal given the character, the conditional probability of observing a signal $v$ given the character A being determined by:

$$P(V|A) = \underset{\substack{1<i<r \\ 1<j<s}}{\pi} P(v_{i,j}|v_{i,j-1};\ v_{i-1,j};\ A)$$

with the definition that $$v_{0j} = v_{i0} = 0 \text{ for all } i \text{ and } j,$$

and $$P(v_{i,j}|v_{i,j-1};v_{i-1,j};A = \begin{Bmatrix} P(v_{11}|A) & \text{if } i=j=1 \\ P(v_{1j}|v_{1,j-1},A) & \text{if } i=1 \text{ and } j>1 \\ P(v_{i1}|v_{i-1,1},A) & \text{if } i>1 \text{ and } j=1 \end{Bmatrix}$$

the location $(i, j)$ and its signal $v_{i,j}$ in the general expression $P(v_{i,j-1};\ v_{i-1,j};\ A)$ assuming one of eight possible values depending upon the arbitrarily defined binary state (ONE or ZERO) of $v_{i,j}$ and the neighbors $v_{i-1,j}$ and $v_{i,j-1}$ said given term being expanded to:

$$P(v_{i,j}|v_{i,j-1};v_{i-1,j},A) = \left. \begin{matrix} \left\{\beta_0(i,j,A)\left[\dfrac{\gamma_0(i,j,A)}{\beta_0(i,j,A)}\right]^{v_{i,j}}\right\}^{(1-v_{i,j-1})(1-v_{i-1,j})} \\ \cdot\left\{\beta_1(i,j,A)\left[\dfrac{\gamma_1(i,j,A)}{\beta_1(i,j,A)}\right]^{v_{i,j}}\right\}^{(1-v_{i,j-1})(v_{i-1,j})} \\ \cdot\left\{\beta_2(i,j,A)\left[\dfrac{\gamma_2(i,j,A)}{\beta_2(i,j,A)}\right]^{v_{i,j}}\right\}^{v_{i,j-1}(1-v_{i-1,j})} \\ \cdot\left\{\beta_3(i,j,A)\left[\dfrac{\gamma_3(i,j,A)}{\beta_3(i,j,A)}\right]^{v_{i,j}}\right\}^{v_{i,j-1}(v_{i-1,j})} \end{matrix} \right\}$$

where $\beta$ and $\gamma$ are determined by means utilizing the statistical history derived from a large population of specimen alpha-numerical characters or other font, $\beta$ signifying that the signal $v_{i,j}$ for location $(i,j)$ is binary ZERO, and $\gamma$ signifying that the signal $v_{i,j}$ for location $(i,j)$ is binary ONE, and the respective subscripts defining the state of the said two neighbors, (c) means for determining the joint probability for an unknown signal $v$ and conditional probability for the alpha-numerical characters, the joint probability of $v$ and A being PAP(V|A), and (d) means connected to said determining means for selecting the maximum probability signal of the joint probabilities determined by said determining means, to thereby positively identify the discrete alpha-numerical character or other font associated therewith.

2. Apparatus for identifying alpha-numerical characters or other font comprising:

(a) means for arranging characters or other font to be identified in a matrix of $r$ rows and $s$ columns of elemental areas, the location $(i,j,)$ being in the $i$th row and the $j$th column, (b) means for determining by neighborhood dependence every alpha-numerical character to be recognized (A, B, C . . . 1, 2, 3 . . . etc.) including means for determining the conditional probability of observing a signal given the character the conditional probability of observing a signal $v$ given the character A being:

$$P(V|A)=\pi(Pv_{ij}|v_{i,j-1};\ v_{i-1,j};\ A)\quad \begin{matrix}1\leq i\leq r\\ 1\leq j\leq s\end{matrix}$$

with the definition that $$v_{0j}=v_{i0}=0,\ \text{for all } i \text{ and } j$$

and $$P(v_{i,j}|v_{i,j-1},\ v_{i-1,j},\ A= \begin{cases} P(v_{11}|A) & \text{if } i=j=1\\ P(v_{1j}|v_{1,j-1},\ A) & \text{if } i=1 \text{ and } j>1\\ P(v_{i1}|v_{i-1,1},\ A) & \text{if } i>1 \text{ and } j=1 \end{cases}$$

(c) means for determining the joint probability of the unknown signal $v$ and the alpha-numerical characters by utilizing any monotonic function of their joint probabilities, i.e., the logarithm of the joint probability, the logarithm of the joint probability of $v$ and A designed T(V|A) being:

$$\left.\begin{aligned} T(V|A)=\ln PAP(V|A= & \\ b(A)+\sum_{ij}w_1(i,\ j,\ A)v_{i,j} & \\ +\sum_{ij}w_2(i,\ j,\ A)v_{i,j},\ v_{i,j-1} & \\ +\sum_{ij}w_3(i,\ j,\ A)v_{i,j},\ v_{i-1,j} & \\ +\sum_{ij}w_4(i,\ j,\ A)v_{i,j-1},\ v_{i-1,j} & \\ +\sum_{ij}w_5(i,\ j,\ A)v_{i,j},\ v_{i,j-1},\ v_{i-1,j} & \end{aligned}\right\}$$

where summation indicates $i$ and $j$ run through the entire character field from 1 to $r$ and $s$ respectively. The bias $b$(A) and weights $w$'s are given by the following equation:

$$\left.\begin{aligned} b(A)&=\ln PA+\sum_{ij}\ln\beta_0(i,\ j,\ A)\\ w_1(i,\ j,\ A)&=\ln\frac{\gamma_0(i,\ j,\ A)\beta_2(i,\ j+1A)\beta_1(i+1,\ j,\ A)}{\beta_0(i,j,A)\beta_0(i,j,\ +1A)\beta_0(i,\ +1,j,A)}\\ w_2(i,\ j,\ A)&=\ln\frac{\beta_0(i,\ j,\ A)\gamma_2(i,\ j,\ A)}{\gamma_0(i,\ j,\ A)\beta_2(i,\ j,\ A)}\\ w_3(i,\ j,\ A)&=\ln\frac{\beta_0(i,\ j,\ A)\gamma_1(i,\ j,\ A)}{\gamma_0(i,\ j,\ A)\beta_1(i,\ j,\ A)}\\ w_4(i,\ j,\ A)&=\ln\frac{\beta_0(i,\ j,\ A)\beta_3(i,\ j,\ A)}{\beta_1(i,\ j,\ A)\beta_2(i,\ j]\ A)}\\ w_5(i,\ j,\ A)&=\ln\frac{\gamma_0(i,j,A)\beta_1(i,j,A)\beta_2(i,j,A)\gamma_3(i,j,A)}{\beta_0(i,j,A)\gamma_1(i,j,A)\gamma_2(i,j,A)\beta_2(i,j,A)} \end{aligned}\right\}$$

To accommodate the boundary points, the following definitions are used:

$$\left.\begin{aligned} \frac{\beta_2(i,\ s+1,\ A)}{\beta_0(i,\ s+1,\ A)}&=1\\ \frac{\beta_1(r+1,\ jA)}{\beta_0(r+1,\ jA)}&=1 \end{aligned}\right\}$$

for all $i$, $j$ and $A$ and, (d) means connected to said determining means of paragraph (c) for selecting the largest of the log of the joint probabilities to thereby positively identify the discrete alpha-numerical character or other font associated therewith.

3. Apparatus for comparing a first indicia with a second indicia, comprising:

sampling means for sampling said first indicia to obtain a plurality of first signals each coresponding to a portion of said first indicia;

a plurality of weighting means, having an input terminal and an output terminal, for changing the value of a signal applied to its input terminal in accordance with the magnitude of a transfer-function means electrically connected between the input terminal and the output terminal of said weighting means;

arithmetic means, electrically connected to said sampling means and to said plurality of weighting means, for applying a plurality of second signals to said weighting means which signals are a function of groups of said first signals;

each of said transfer-function means having a magnitude which corresponds to a function of a portion of said second indicia;

and second arithmetic means, electrically connected to said output terminals of said plurality of weighting means, for providing an output signal which is a function of the signals appearing at the output terminals of said plurality of weighting means, whereby said output signal from said second arithmetic means indicates a degree of correspondence between said first indicia and said second indicia.

4. Apparatus for comparing a first indicia with a second indicia in accordance with claim 3 in which:

said transfer means comprise a resistor; and said second arithmetic means comprises an adder, whereby the correlation between said first indicia and said second indicia is obtained.

5. Apparatus for comparing a first indicia with a second indicia in accordance with claim 4 in which:

said sampling means comprises a transducer means for generating at predetermined intervals a first electrical voltage indicating the presence of said first indicia and for generating a second voltage indicating the absence of said first indicia; and said first arithmetic means comprises a plurality of logical AND gates having inputs electrically connected to said sampling means, whereby voltages from adjoining intervals are applied to said logical AND gates.

6. Pattern recognition apparatus comprising:

scanning means for scanning input character patterns to be recognized, quantizing means, electrically connected to said scanning means, for producing a binary "one" signal when said scanning means senses portions of said pattern and for generating binary "zero" signals when said scanning means does not sense a portion of said pattern at selected intervals;

a plurality of AND gates;

connecting means for connecting the output voltages from said quantizing means to said AND gates;

the outputs from said connecting means forming a raster in which said binary "one" signals represent the portions of said raster containing said pattern;

some of said AND gates having different ones of their inputs electrically connected to adjacent outputs of said connecting means;

a plurality of weighting networks each representing a different character pattern being electrically connected to the outputs of said logical AND gates; and maximum-detection means, electrically connected to said weighting networks, for indicating which of said weighting networks has the largest output signal, whereby said character pattern being scanned may be identified.

7. Pattern recognition apparatus according to claim 6 in which said weighting networks contain weighting resistors electrically connected at one end to the outputs of said logical AND gates and having values representative of the statistical probability that the adjacent points on said scanned character patterns will provide a binary "one" for the character represented by said weighting network.

8. A character recognition system comprising (a) means for sequentially scanning adjacent segments of an input character to be recognized, (b) means connected to the sequential scanning means for converting the information obtained by said scanning into a plurality of binary electrical signals, (c) a two-dimensional matrix of storage elements having $r$ rows and $s$ columns for temporary storage therein connected to receive said plurality of binary signals, (d) AND gate means connected to said two dimensional matrix for AND gating each of said binary signals stored in said matrix with the binary signals stored in a plurality of neighboring adjacent storage elements of said matrix to provide AND gated output signals, (e) a plurality of reference character networks to simultaneously receive all of the gated output signals wherein one of said plurality of reference character networks corresponds to one input character to be recognized, and (f) means for selecting the maximum output signal deviation from among said plurality of reference networks to thereby provide detection of the input character to be recognized.

9. The character recognition system as set forth in claim 8 wherein said AND gate means (d) includes means for simultaneously applying each of said stored binary signals as one input signal to a plurality of two input signal AND gates and a plurality of three input AND gates, also simultaneously applying as the remaining input signals to said two input and three input AND gates, the stored binary signals from a plurality of storage elements adjacently located to each of storage elements of said two-dimensional storage matrix.

10. The character recognition system as set forth in caim 8 wherein said plurality of reference character networks which simultaneously receive of said logically gated signals includes means for initially applying all of said logically gated signals to a plurality of biased weighting networks simultaneously, one of said plurality of weighting networks corresponding to each input character to be recognized, a maximum detection network, and means for thereafter applying the output signals from each of said biased weighting networks to said maximum detection network.

11. The character recognition system as set forth in claim 10, wherein said plurality of weighting networks includes means for determining the weighted values ($w$'s) and the constant bias value (b) for a plurality of resistors for use in each of said weighing networks in accordance with the following mathematical rule:

$$b(k)=\ln p_k+\ln \beta_0(i,j,k)$$

$$w_1(i,j,k)=\ln \frac{\gamma_0(i,j,k)\beta_2(i,j+1,k)\beta_1(i+1,j,k)}{\beta_0(i,j,k)\beta_0(i,j+1,k)\beta_0(i+1,j,k)}$$

$$w_2(i,j,k)=\ln \frac{\beta_0(i,j,k)\gamma_2(i,j,k)}{\gamma_0(i,j,k)\beta_2(i,j,k)}$$

$$w_3(i,j,k)=\ln \frac{\beta_0(i,j,k)\gamma_1(i,j,k)}{\gamma_0(i,j,k)\beta_1(i,j,k)}$$

$$w_4(i,j,k)=\ln \frac{\beta_0(i,j,k)\beta_3(i,j,k)}{\beta_1(i,j,k)\beta_2(i,j,k)}$$

$$w_5(i,j,k)=\ln \frac{\gamma_0(i,j,k)\beta_1(i,j,k)\beta_2(i,j,k)\gamma_3(i,j,k)}{\beta_0(i,j,k)\gamma_1(i,j,k)\gamma_2(i,j,k)\beta_3(i,j,k)}$$

where $\beta$ and $\gamma$ are determined by the statistical history derived from a large population of specimen alpha-numerical characters or other font, $\beta$ signifying that the signal $v_{i,j}$ for location $(i,j)$ is binary ZERO, and $\gamma$ signifying that the signal $v_{i,j}$ for location $(i,j)$ is binary ONE, and the respective subscripts defining the state of neighboring adjacent storage elements.

References Cited

UNITED STATES PATENTS

| | | | |
|---|---|---|---|
| 2,877,951 | 3/1959 | Rohland | 235—61.11 |
| 2,889,535 | 6/1959 | Rochester | 340—149 |
| 2,959,769 | 11/1950 | Greamias | 340—149 |
| 3,167,743 | 1/1965 | McDermid | 340—146.3 |

MAYNARD R. WILBUR, *Primary Examiner.*

DARLY W. COOK, *Examiner.*

J. S. IANDIORIO, J. I. SCHNEIDER, *Assistant Examiners.*

UNITED STATES PATENT OFFICE
CERTIFICATE OF CORRECTION

Patent No. 3,341,814 September 12, 1967

Chao Kong Chow

It is hereby certified that error appears in the above numbered patent requiring correction and that the said Letters Patent should read as corrected below.

Column 3, line 39, for "recognization" read -- recognition --; column 7, line 20, after "w's", in italics, insert -- are --; lines 49 and 50, the equation should appear as shown below instead of as in the aptent:

$$\frac{\beta 1(r+1, j, A)}{\beta 0(r+1, j, A)} = 1$$

column 9, line 57, for "is" read -- in --; column 14, lines 25 and 26, for "1<i<r" and "1<j<s" read -- $1 \leq i \leq r$ --, and -- $1 \leq j \leq s$ --; column 17, line 45, after "receive" insert -- all --.

Signed and sealed this 24th day of September 1968.

(SEAL)
Attest:

EDWARD M.FLETCHER,JR.
Attesting Officer

EDWARD J. BRENNER
Commissioner of Patents